United States Patent [19]

Matsui

[11] Patent Number: 4,699,890
[45] Date of Patent: Oct. 13, 1987

[54] SILICON NITRIDE SINTERED BODY AND METHOD OF PRODUCING THE SAME
[75] Inventor: Minoru Matsui, Nagoya, Japan
[73] Assignee: NGK Insulators, Ltd., Japan
[21] Appl. No.: 756,271
[22] Filed: Jul. 18, 1985
[30] Foreign Application Priority Data
Sep. 7, 1984 [JP] Japan ............................... 59-186287
[51] Int. Cl.$^4$ ............................................. C04B 35/58
[52] U.S. Cl. ....................................... 501/98; 501/97; 264/65
[58] Field of Search ....................... 501/97, 98; 264/65

[56] References Cited
U.S. PATENT DOCUMENTS 4,180,410 12/1979 Masaki .................................... 501/98
4,280,850 7/1981 Smith et al. ............................ 501/97
4,388,414 6/1983 Mangels et al. ........................ 501/98
4,535,063 8/1985 Matsuhiro et al. .................... 501/97

FOREIGN PATENT DOCUMENTS 0107919 5/1984 European Pat. Off. .
2820694 11/1978 Fed. Rep. of Germany .
56-59674 5/1981 Japan .
58-50944 11/1983 Japan .
59-8670 1/1984 Japan .

OTHER PUBLICATIONS

Giachello, A. et al. "Sintering and Properties of Silicon Nitride Containing $Y_2O_3$ and MgO"–Ceramic Bull., 59(2), 1980, pp. 1212–1215.
Chemical Abstracts, vol. 90, (1979).
Chemical Abstracts, vol. 99, (1983).

Primary Examiner—William R. Dixon, Jr.
Assistant Examiner—A. Knab
Attorney, Agent, or Firm—Parkhurst & Oliff

[57] ABSTRACT

A highly dense $Si_3N_4$ sintered body having a substantially crystalline intergranular phase, which has an improved mechanical strength at high temperatures and excellent static fatigue properties so as to be particularly useful for high temperature structural components or parts, is produced by sintering a molded body of a blend comprising $Si_3N_4$, Y-, Mg- and Ce-compounds with a specified composition range.

6 Claims, 3 Drawing Figures

Diffraction Angle (2θ)

SILICON NITRIDE SINTERED BODY AND METHOD OF PRODUCING THE SAME

BACKGROUND OF THE INVENTION

1. Field of the Invention

This invention relates to a highly dense sintered body of silicon nitride having an improved mechanical strength and a method of producing the same, and more particularly to a highly dense silicon nitride sintered body containing predetermined amounts of $Y_2O_3$, MgO and $CeO_2$ and having a crystalline intergranular phase and exhibiting excellent static fatigue properties.

2. Description of the Prior Art

Silicon nitride sintered bodies are superior to metallic materials in mechanical strength at high temperature, heat resistance, thermal shock resistance, corrosion resistance and the like, so that they are considered to be used for high temperature structural components, which cannot be adapted to use metallic materials, and the development of their applications is performed extensively.

Since silicon nitride can not easily be subjected to solid-phase sintering owing to the covalent bonding substance, it is subjected to liquid-phase sintering wherein additives such as $Y_2O_3$, $Al_2O_3$, MgO, $CeO_2$, $SiO_2$, $ZrO_2$, rare earth oxides, AlN and the like are added to silicon nitride and a glassy phase is formed at a sintering temperature to effect densification. Thus, the resulting sintered body contains a large amount of glassy phase in its grain boundary produced during sintering thereof. Therefore, when such bodies are used in high temperature environments, the glassy phase in the grain boundary is softened to degrade static fatigue properties and oxidation resistance resulting from mechanical strength, creep deformation and creep rupture.

Consequently, many studies have been made with respect to a method for crystallizing the intergranular phase without the formation of a glassy phase. In Japanese Patent laid open No. 55-3,397, U.S. Pat. No. 4,280,850, there is disclosed a method, wherein silicon nitride is added with $Y_2O_3$ and $SiO_2$ and then fired to obtain a silicon nitride sintered body containing crystalline phases of $Y_2O_3.2SiO_2$ and $10Y_2O_3.9SiO_2.Si_3N_4$ in its grain boundary. In Japanese Patent laid open No. 56-59,674, there is disclosed a method, wherein silicon nitride is added with $Y_2O_3$ and then fired to obtain a silicon nitride sintered body containing a crystalline phase of $xY_2O_3.ySi_3N_4$ in its grain boundary. Further, in Japanese Patent laid open No. 59-8,670, a silicon nitride sintered body having an intergranular phase of melilite mineral facies represented by (Si, Mg, Y)(O, N) is also shown. Furthermore, in Japanese Patent Application Publication No. 58-50,994, there is disclosed a method, wherein a silicon nitride sintered body containing $Y_2O_3$ or $CeO_3$ is reheated to form a crystal of $Y_2O_3.Si_3N_4$ or $CeO_3.Si_3N_4$ in the intergranular phase. These silicon nitride sintered bodies having crystallized intergranular phases all exhibit an improved high temperature strength.

However, in order to decrease the glassy phase in the intergranular phase causing the reduction of high temperature strength, it is required to restrict the composition of additives to the composition of the crystalline intergranular phase. In this case, a sufficient amount of sintering aid can not be added to conduct densification of the silicon nitride, so that a dense sintered body is not obtained. Further, the dense silicon nitride sintered body may be obtained by hot press sintering even with the restricted composition of additives, but the hot press sintering has such drawbacks that the productivity is poor and components of complicated shape can not be manufactured. Moreover, the crystallization of the grain boundary is performed in an inert gas atmosphere during cooling from the sintering temperatures or reheating, so that the crystalline phase formed in the grain boundary is not always stable in an oxidizing atmosphere as a usual service condition. Consequently, when the sintered body is used in an oxidizing atmosphere, the mechanical strength or oxidation resistance is appreciably deteriorated due to cracks produced by locally changing the volume of the crystalline phase in the grain boundary. The silicon nitride sintered bodies, wherein the greater part of the grain boundary is composed of crystalline phase, show neither creep deformation nor creep rupture under a static load at elevated temperatures owing to no softening of glassy intergranular phase, but produce static fatigue without any deformation due to subcritical crack growth accompanied with gradual growth of initial internal defects and eventually rupture after a lapse of a certain amount of time even under a stress smaller than that corresponding to an instant fracture strength such as flexural strength or the like. Such static fatigue properties can be estimated by stress dependence of the time until the rupture of the body occurs. The subcritical crack growth resulting in the static fatigue is conceived to be affected by thermal and chemical stabilities and mechanical strength of intergranular phase; microstructural stress generated by a difference in thermal expansion between the intergranular phase and $Si_3N_4$ crystal grains during cooling from the sintering temperature; adhesion between the intergranular phase and $Si_3N_4$ crystal grains; properties and amount of the remaining glassy phase and so forth. Therefore, the silicon nitride sintered bodies having the crystallized intergranular phase reduce the reliability as a component material to be used under a stress for a long time due to the static fatigue rupture caused by the subcritical crack growth.

SUMMARY OF THE INVENTION

It is an object of the invention to eliminate the above described drawbacks of the prior art. Namely, the object of the invention is to specify the composition and microstructure of a highly dense silicon nitride sintered body having a substantially crystalline intergranular phase and exhibiting high strengths at elevated temperatures and excellent static fatigue properties which cause neither creep deformation nor subcritical crack growth under static stress and to establish a method of producing the same. More particularly the object of the invention is to provide a silicon nitride sintered body having no fracture under a static stress smaller than the stress corresponding to the instant fracture strength at a temperature of 1,000° C. or below for longer than a given period of time or even forever.

The above object of the invention can be achieved by a silicon nitride sintered body consisting mainly of $Si_3N_4$ and containing Y, Mg and Ce, wherein the content of $Si_3N_4$ is 75–95% by weight, the content of Y is 2–15% by weight as $Y_2O_3$, the content of Mg is 1–10% by weight as MgO and the content of Ce is 1–10% by weight as $CeO_2$, respectively based on the sintered body. Further, the invention lies in a method of producing silicon nitride sintered bodies, which comprises molding a powdery mixture of 75–95% by weight of silicon nitride starting powder and Y-, Mg- and Ce-compounds as a sintering aid in amounts of 2–15% by weight as $Y_2O_3$, 1–10% by weight as MgO and 1–10% by weight as $CeO_2$, and then sintering the resulting molded body at a temperature of 1,650°–1,800° C. in a nitrogen or an inert gas atmosphere. Moreover, the silicon nitride sintered body according to the invention has a substantially crystalline integranular phase.

The invention concerning a silicon nitride sintered body and a method of producing the same is based on the facts that a glassy phase comprising Y, Mg, Ce, Si, O and N within specified amount ranges is formed between $Si_3N_4$ crystal grains during the sintering step and effectively acts as a sintering aid at the densification step in liquid-phase sintering to provide a dense silicon nitride sintered body, and that the glassy phase in the grain boundary formed during the sintering changes into a thermally and chemically stable crystalline phase or a combination of at least two crystalline phases permitted to have a wide composition range inclusive of the composition of the glassy phase, during cooling from the sintering temperature. And also, the invention is based on the fact that the silicon nitride sintered body according to the invention exhibits excellent static fatigue properties without causing creep deformation, subcritical crack growth and so on at the temperature range not exceeding 1,000° C.

DETAILED DESCRIPTION OF THE INVENTION

The silicon nitride sintered body according to the invention will be described hereinafter in more detail.

Heretofore, the compounds of Y, Mg and Ce are used alone or in combination of two, or together with another third ingredient as a sintering aid. In these cases, each compound of Y, Mg and Ce turns into its oxide, oxynitride and/or nitride in sintered bodies inclusive of the silicon nitride sintered body according to the invention, and in particular, Ce generally exists in the trivalent state. In the silicon nitride sintered body according to the invention, the combination of Y-, Mg- and Ce-compounds with the specified composition range develops a densification effect as a sintering aid equal to or more than that in the case of using such compounds alone or in combination of two, owing to the synergistic action of these three compounds. These compounds are converted into oxides, oxynitrides or nitrides during the sintering to form a glassy integranular phase, which is easily densified in a nitrogen gas atmosphere under normal pressures through liquid phase sintering consisting of a rearrangement step and a dissolution precipitation step. However, the composition range of the silicon nitride sintered body according to the invention not only is a range capable of providing a highly dense silicon nitride sintered body, but significantly lies in that the Y-, Mg- and Ce-compounds converted into oxides, oxidonitrides or nitrides react with $Si_3N_4$ of silicon nitride material powder and $SiO_2$ usually contained therein to form a glassy phase consisting mainly of Y, Mg, Ce, Si, O and N in the grain boundary of the sintered body, a greater part or all of which is readily converted into a crystalline phase during cooling from the sintering temperature.

Figure 1:
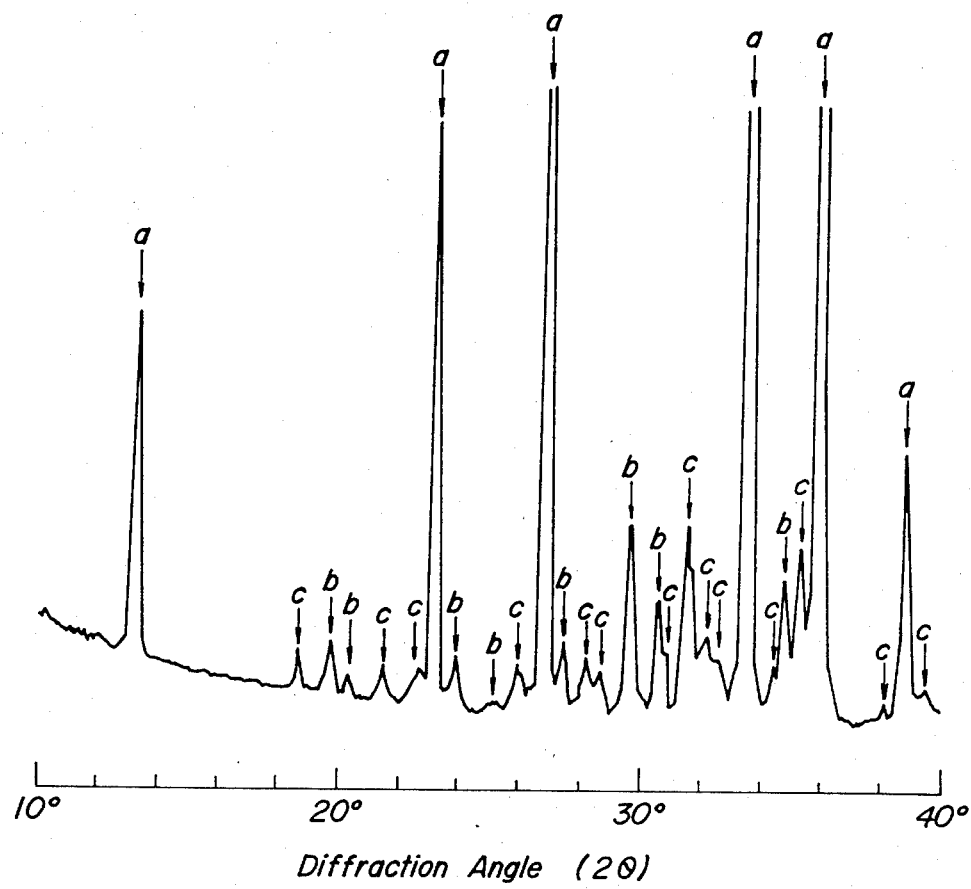
FIG. 1 is a diffraction pattern of the silicon nitride sintered body No. 5 according to the invention by X-ray diffraction analysis with CuKα radiation.

FIG. 1 shows an example of a diffraction pattern in the silicon nitride sintered body according to the invention by an X-ray diffraction analysis with CuKα radiation. The silicon nitride sintered body according to the invention exhibits principally diffraction lines assigned to $\beta$-$Si_3N_4$ as indicated by "a" in FIG. 1 as well as diffraction lines assigned to crystalline intergranular phases as indicated by "b" and "c" in FIG. 1. Among them, the diffraction line indicated by "c" in FIG. 1 corresponds to that of $Si_3N_4.10Y_2O_3.9SiO_2$ shows in JCPDS Card 30-1462. Besides, there may be observed another diffraction line assigned to α-$Si_3N_4$.

Figure 2:
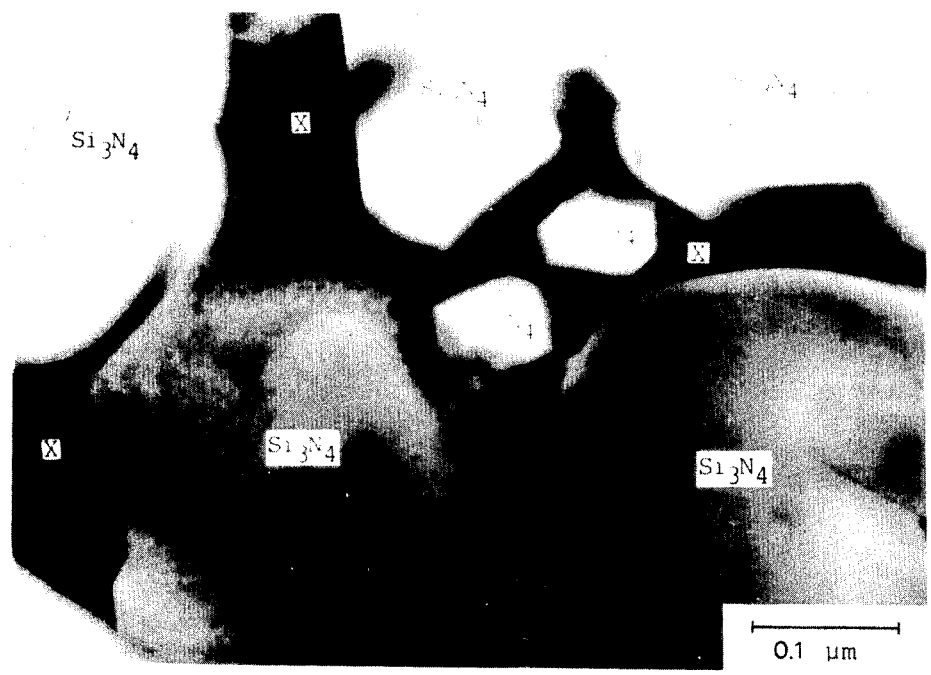
FIG. 2 is an electron micrograph showing a grain structure of the silicon nitride sintered body No. 5 according to the invention.

FIG. 2 shows an embodiment of the microstructure of the silicon nitride sintered body according to the invention observed by means of an electron microscope. The grains denoted as "$Si_3N_4$" in FIG. 2 are $Si_3N_4$ crystal grains, while the other part as denoted by "X" in FIG. 2, or intergranular phase is occupied by crystal grains causing electron diffraction, and contains hardly any glassy phase. Further, it has been found that the crystalline intergranular phase contains Y, Mg, Ce and Si as a cation as a result of an elemental analysis by an energy dispersive type X-ray elemental analyser under an electron microscope, and O and N as an anion by an electron energy loss spectrometer.

As described above, the intergranular phase of the silicon nitride sintered body according to the invention includes crystalline phases containing substantially no glassy phase, as shown in the microstructure observed by the electron microscope, and exhibits clear diffraction lines in an X-ray diffraction analysis. These crystalline intergranular phases can not strictly be identified, but may be a single crystalline phase or a combination of two or more crystalline phases. In short, the silicon nitride sintered body according to the invention has the intergranular phase converted substantially into a crystalline phase through the densification in the sintering step and the cooling from sintering temperature by incorporating Y, Mg and Ce within the specified composition range, which exhibits the X-ray diffraction lines, as shown in FIG. 1, and the microstructure as shown in FIG. 2.

The silicon nitride sintered body according to the invention has a high mechanical strength and a good oxidation resistance, and does not exhibit creep deformation or subcritical crack growth under static stresses over a temperature range of from room temperature to 1,000° C., and is held without fracture under a static stress smaller than the instant fracture stress for longer than a given period of time or even forever. This is considered to be due to the fact that the intergranular phase in the silicon nitride sintered body according to the invention is substantially a crystalline phase wherein very little or no glassy phase exists, which crystalline phase being stable in an oxidizing atmosphere over a temperature range of from room temperature to 1,000° C., and has a good adhesion to $Si_3N_4$ grains. Also the density of the sintered body is high.

As mentioned above, the silicon nitride sintered body according to the invention having the specified composition range of Y, Mg and Ce is a highly dense sintered body having particularly excellent static fatigue properties, because a glassy intergranular phase having a high densification effect is formed during sintering by the synergistic action of the combination of Y-, Mg- and Ce-ingredients and then converted into a substantially stable crystalline phase during the cooling from the sintering temperature. On the other hand, in the silicon nitride sintered bodies having a composition outside the composition ranges defined in the invention, if the content of $Si_3N_4$ exceed 95% by weight, the amount of the sintering aid is insufficient to conduct satisfactory densification, while if it is less than 75% by weight, the mechanical properties and heat resistance inherent to $Si_3N_4$ can not be developed satisfactorily. Furthermore, when even any one of Y, Mg and Ce does not fall in the range specified in the invention, i.e. 2-15% by weight as $Y_2O_3$, 1-10% by weight as MgO and 1-10% by weight as $CeO_2$, the sufficient function as a sintering aid is not obtained during sintering to conduct no densification or leave a large amount of glassy phase in the intergranular phase, or the resulting crystalline intergranular phase becomes unstable thermally and chemically and has a poor adhesion to the $Si_3N_4$ grains. Therefore, the silicon nitride sintered bodies having a composition outside the composition ranges defined in the invention are poor in mechanical strength, oxidation resistance and particularly static fatigue properties.

The method of producing the silicon nitride sintered body according to the invention is a method of the production of sintered bodies having particular microstructure and properties within the composition range specified according to the invention as described hereinbefore. Now, this method will be described in detail hereinafter.

At first, 75-95% by weight of silicon nitride raw powder is blended with Y-, Mg- and Ce-compounds as sintering aids in respective amounts of 2-15% by weight as $Y_2O_3$, 1-10% by weight as MgO and 1-10% by weight as $CeO_2$. In the silicon nitride raw powder and the Y-, Mg- and Ce-compounds, the kind and amount of impurities vary depending upon their manufacturing processes, which impurities usually remain as a glassy phase in the intergranular phase of the silicon nitride sintered body, resulting in the deterioration of mechanical strength at elevated temperature, heat resistance and static fatigue properties. Accordingly, it is preferred that each starting material has a purity of 96% by weight or more and particularly, the cationic impurities contained therein do not exceed 1% by weight. Further, the Y-, Mg- and Ce-compounds turn into oxides, oxynitrides or nitrides in the sintered body, so that they may be used as salts, alkoxides and the like or in the form of solution, which can thereafter be converted into oxides. In this case, however, these compounds are subjected to a heat treatment in an oxidizing atmosphere, so that the $Si_3N_4$ raw powder is oxidized or the decomposition gas hindering the densification is generated. As the compound therefore, it is rather preferable to employ oxide powders such as $Y_2O_3$, MgO and $CeO_2$.

The pulverizing and mixing of the starting material powders are carried out by either wet process with water or organic solvent or dry process, using a vibration mill, rotary mill, attrition mill or the like. In this case, it is desirable to employ steel balls coated with nylon resin or silicon nitride porcelain balls in order to prevent the incorporation of impurities due to the wearing of the balls used during the pulverization and mixing. The pulverizing time is dependent upon the pulverization system and the amount of the powders treated, but the pulverising is preferable to be continued until constant saturated values of average particle size and BET specific surface area of the pulverized powder have been attained. The blend powder obtained by pulverizing and mixing, dried when the wet process applied, is molded into a desired shape by an ordinary dry press molding, an extrusion molding, a slip cast molding, an injection molding, a combination of hydrostatic pressing therewith, or the like. Then, the molded body is sintered at a temperature of 1,650°-1,800° C. in a nitrogen gas atmosphere or in an inert gas atmosphere for a sufficient time and cooled down to below 1,500° C. to obtain a silicon nitride sintered body. In this case, however, a fully dense sintered body may not be obtained in the inert gas atmosphere because $Si_3N_4$ is apt to decompose and sublimate in this atmosphere, so that the use of the nitrogen gas atmosphere is preferable. Although sintering may be carried out at elevated temperatures to effect the densification under a pressurized nitrogen gas atmosphere while suppressing the vaporization of $Si_3N_4$, the silicon nitride sintered body with the specified composition range according to the invention is sufficiently densified by sintering at 1,650°-1,800° C. in a pressureless nitrogen gas atmosphere, so that the sintering under a pressurized nitrogen gas atmosphere is not necessarily required in the invention. When sintering under the pressureless nitrogen gas atmosphere, when the sintering temperature is lower than 1,650° C., the sintering is insufficient to conduct densification, while when it exceeds 1,800° C., the decomposition and vaporization of $Si_3N_4$ become so violent that a dense sintered body can not be obtained. Furthermore, the intergranular phase in the silicon nitride sintered body according to the invention is substantially converted into a crystalline phase during cooling below 1,500° C. from sintering temperatures after the sintering. Moreover, if the crystallization is insufficient due to the quick quenching or the like after the sintering, the intergranular phase can be fully converted into crystalline phase by re-heating at 1,500° C. or below.

As mentioned above, the method of producing the silicon nitride sintered bodies according to the invention comprises steps of blending silicon nitride starting powder with Y-, Mg- and Ce-compounds at the predetermined blending ratio, molding the resulting blend and sintering it, so that the thus obtained silicon nitride sintered bodies have substantially all crystalline phase in the intergranular phase and exhibit a high mechanical strength, a good oxidation resistance and, in particular, excellent static fatigue properties.

The invention will be described in detail with reference to the following example.

EXAMPLE

Silicon nitride starting powder having a purity of 97.1% by weight, an average particle size of 0.7 μm and a BET specific surface area of 20 m²/g was blended with $Y_2O_3$, MgO and $CeO_2$ starting powders each having a purity of 98-99% by weight, an average particle size of 0.6-2 μm and a BET specific surface area of 8-30 m²/g at a composition ratio as shown in Table 1, which was placed in a nylon resin container of 1.2 l capacity together with 1.2 kg of silicon nitride porcelain balls and 500 ml water based on 200 g of the blend and then pulverized by means of a vibration mill with vibration of 1,200 cycles/min for 10 hours. After water was vaporized, the pulverized mixture was granulated into grains for molding having a grain size of 100 μm. Subsequently, the grains were subjected to hydrostatic pressing under a pressure of 3 tons/cm² to form a molded body of 60×60×6 mm, which was subjected to pressureless sintering at temperature shown in Table 1 in a nitrogen gas atmosphere for 30 minutes to obtain each of silicon nitride sintered bodies No. 1-10 of the invention. Besides the above, silicon nitride sintered bodies No. 11-20 as a comparative example each having a composition outside the range defined in the invention were prepared under the same conditions as described above. The result of chemical analysis on these sintered bodies shows that the compositions of Y, Mg and Ce in the silicon nitride sintered bodies No. 1-20 are substantially coincident with that of the starting blend. In Table 1 are also shown the properties of the sintered body such as bulk density, state of intergranular phase, four point bending strengths at room temperature and 1,000° C., and stress causing no fracture even under a static loading at 1,000° C. for 100 hours and deformation accompanied therewith as static fatigue properties.

electron microscope observation, whereby it has been confirmed that crystals denoted as "b" (diopside-type) and "c" (apatite-type) in Table 1 exhibit diffraction lines indicated by "b" and "c" in FIG. 1 as mentioned later and that the microstructure includes a crystalline phases in addition to $Si_3N_4$. The forsterite has been identified with a compound formulated as $2MgO.SiO_2$, while the unidentifiable phase means to include unidentified diffraction lines other than those indicated by "b" and "c" in FIG. 1. Furthermore, the presence of glassy phase was identified as a portion causing no electron diffraction in the microstructure.

The diffraction lines by X-ray diffraction analysis with CuKα radiation of the silicon nitride sintered body No. 5 according to the invention are shown in FIG. 1, wherein peaks indicated as "a" are of $\beta$-$Si_3N_4$, peaks "b" and "c" are of crystalline intergranular phases and, in particular, peaks "c" are coincident with interplanar spacing of $Si_3N_4.10Y_2O_3.9SiO_2$ shown in JCPDS Card 30-1462. The electron micrograph in the microstructure of silicon nitride sintered body No. 5 according to the invention is shown in FIG. 2, wherein portions indicated by "$Si_3N_4$" are $Si_3N_4$ crystal grains and portions

TABLE 1

| | Blend composition (wt %) | | | | Sintering | Bulk density | State of intergranular phase | | Four point bending strength (MPa) | | Static fatigue properties 1,000° C., 100 hrs. | |
|---|---|---|---|---|---|---|---|---|---|---|---|---|
| No. | $Si_3N_4$ | $Y_2O_3$ | MgO | $CeO_2$ | temp. (°C.) | (g/cm³) | crystalline phase | glassy phase | room temp. | 1,000° C. | stress causing no fracture (MPa) | deformation amount (%) |
| Example | | | | | | | | | | | | |
| 1 | 94 | 2 | 3 | 1 | 1,800 | 3.2 | b,c | none | 690 | 670 | 650 | <0.1 |
| 2 | 82 | 3 | 10 | 5 | 1,700 | 3.2 | b,c | none | 720 | 660 | 625 | <0.1 |
| 3 | 90 | 4 | 1 | 5 | 1,700 | 3.2 | b,c | none | 680 | 640 | 625 | <0.1 |
| 4 | 84 | 4 | 2 | 10 | 1,750 | 3.3 | b,c | none | 700 | 650 | 625 | <0.1 |
| 5 | 88 | 6 | 4 | 2 | 1,750 | 3.2 | b,c | none | 690 | 660 | 650 | <0.1 |
| 6 | 89 | 8 | 2 | 1 | 1,750 | 3.2 | b,c | none | 670 | 620 | 600 | <0.1 |
| 7 | 83 | 8 | 4 | 5 | 1,700 | 3.3 | b,c | none | 750 | 690 | 675 | <0.1 |
| 8 | 82 | 8 | 9 | 1 | 1,700 | 3.3 | b,c | none | 740 | 720 | 650 | <0.1 |
| 9 | 83 | 10 | 2 | 5 | 1,800 | 3.2 | b,c | none | 710 | 660 | 625 | <0.1 |
| 10 | 76 | 15 | 4 | 5 | 1,650 | 3.2 | b,c | none | 700 | 650 | 625 | <0.1 |
| Comparative example | | | | | | | | | | | | |
| 11 | 87 | — | 10 | 3 | 1,700 | 3.2 | forsterite | presence | 740 | 450 | 225 | 0.4 |
| 12 | 88 | 1 | 6 | 5 | 1,750 | 3.3 | forsterite | presence | 670 | 520 | 400 | 0.3 |
| 13 | 88 | 4 | 8 | — | 1,700 | 3.0 | b,c, forsterite | presence | 700 | 680 | 425 | 0.2 |
| 14 | 77 | 6 | 5 | 12 | 1,700 | 3.1 | b,c | presence | 690 | 420 | 350 | 0.3 |
| 15 | 77 | 6 | 11 | 6 | 1,750 | 3.2 | b,c, forsterite | presence | 720 | 430 | 350 | 0.3 |
| 16 | 88 | 8 | 4 | — | 1,750 | 2.9 | b,c | none | 580 | 520 | 425 | 0.1 |
| 17 | 85 | 10 | — | 5 | 1,750 | 2.9 | b,c | none | 490 | 470 | 300 | 0.2 |
| 18 | 79 | 16 | 4 | 1 | 1,700 | 3.0 | b,c | presence | 700 | 680 | 450 | 0.2 |
| 19 | 97 | 1 | 1 | 1 | 1,800 | 2.6 | b,c | none | 430 | 400 | 300 | 0.1 |
| 20 | 73 | 10 | 10 | 7 | 1,700 | 3.2 | b,c unidentifiable phase | presence | 650 | 380 | 250 | 0.3 |

The bulk density of the sintered body was measured by Archimedes' method. The four point bending strength was measured in accordance with "Testing Method for Flexural Strength (Modulus of Rupture) of High Performance Ceramics" prescribed in JIS R-1601. The static fatigue properties were evaluated by inspecting whether or not the specimen of the same size as in the four point bending test was fractured under a given stress at 1,000° C. for 100 hours in the same manner as in the four point bending test, and measuring the deflection amount of the four point test specimen as a deformation amount of the tensile surface. Further, the state of intergranular phase was evaluated from the results of X-ray diffraction analysis with CuKα radiation and indicated by "X" are crystalline intergranular phases causing electron diffraction, being free from any glassy phase.

Figure 3:
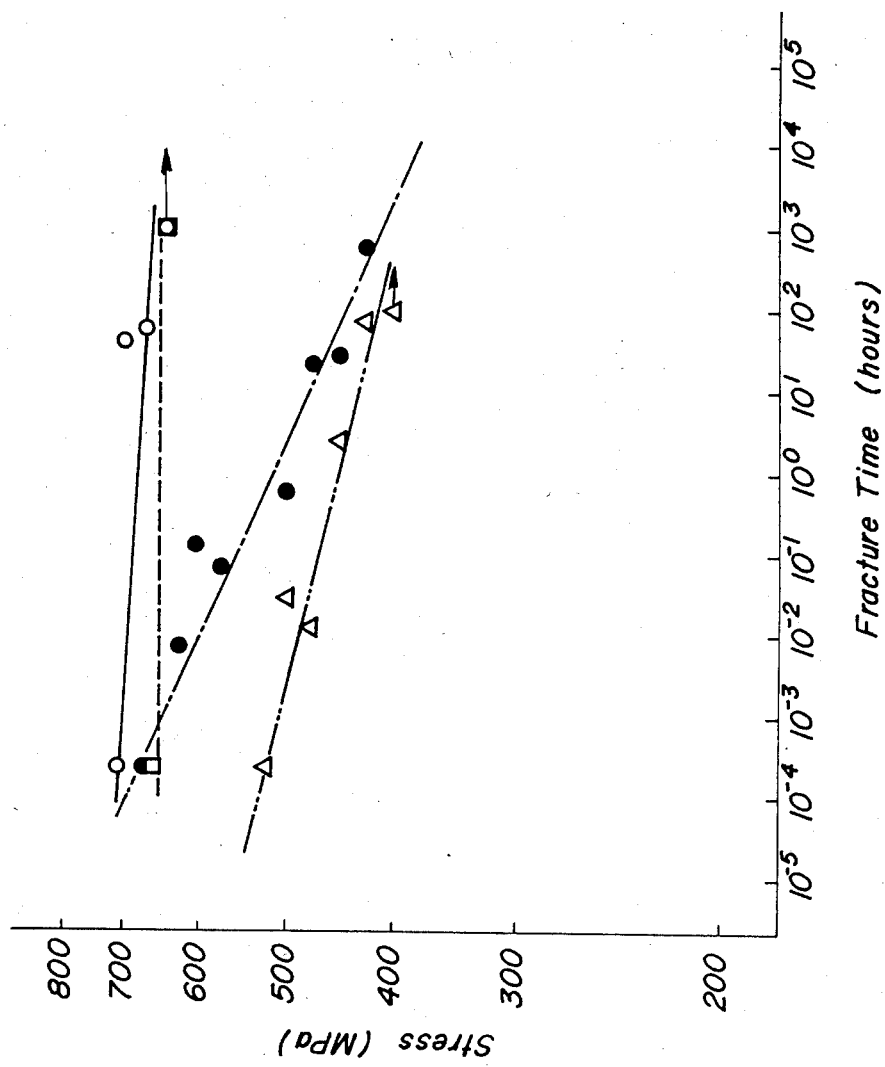
FIG. 3 is a graph showing a relation between static load stress and fracture time in silicon nitride sintered bodies Nos. 5 and 8 according to the invention and Nos. 12 and 13 of comparative examples.

In FIG. 3, is shown the time until fracture under the predetermined stress in the silicon nitride sintered bodies Nos. 5 and 8 according to the invention as well as the sintered bodies Nos. 12 and 13 of comparative examples having a composition outside the range specified in the invention, wherein symbol ○ is the case of the sintered body No. 8, symbol □ the case of the sintered body No. 5, symbol ● the case of the sintered body No. 13 and symbol ▲ the case of the sintered body No. 12. Such an instant fracture as in the four point bending strength is regarded as equivalent to fracture time of about $2 \times 10^{-4}$ hours and the arrow directed to the right from plots means that the specimen was still withstanding without fracture at the time of stopping the measurement and had a longer fracture time.

As seen from Table 1 and FIGS. 1, 2 and 3, the silicon nitride sintered bodies comprising $Si_3N_4$, $Y_2O_3$, MgO and $CeO_2$ in the composition range specified in the invention have a bulk density as high as not less than 3.2 g/cm³, and contain a crystalline intergranular phase in its greater part of grain boundary, and have four point test bending strengths at room temperature and 1,000° C. as high as not less than 670 MPa and not less than 620 MPa, respectively. Particularly, they are very excellent in the static fatigue properties at 1,000° C. as compared with the silicon nitride sintered bodies having a composition outside the specified composition range, and undergoes neither fracture nor deformation for not less than 100 hours even under a stress of 600 MPa. Moreover, as is shown in FIG. 3, the silicon nitride sintered bodies Nos. 5 and 8 according to the invention do not cause fracture at 1,000° C. under a stress of 650 MPa for not less than 1,000 hours.

As mentioned above, according to the invention, the silicon nitride sintered body can be produced by pressureless sintering with some synergistic effects of the predetermined amounts of $Si_3N_4$, Y, Mg and Ce, so that the resulting sintered body is high in density and mechanical strength and very excellent in the static fatigue properties. Since the silicon nitride sintered body according to the invention can be produced by pressureless sintering, the production cost is low and also the production of complicated configurations is possible, so that the sintered body is applicable to various uses as mechanical structure components such as parts of engines, parts of gas turbines and the like. In this case, because of excellent static fatigue properties of the sintered body according to the invention, the reliability on the service life of the components is largely improved and the industrial merits are very large.

What is claimed is

1. A silicon nitride sintered body consisting essentially of $Si_3N_4$, $SiO_2$, Y, Mg, and Ce, wherein the content of Y is 2-15% by weight as $Y_2O_3$, the content of Mg is 1-10% by weight as MgO and the content of Ce is 1-10% by weight as $CeO_2$, and the remainder being $Si_3N_4$ and $SiO_2$ being present as an impurity in the $Si_3N_4$, said $Si_3N_4$ being present in an amount which is not less than 75% by weight and not greater than 95% by weight, and wherein said sintered body has a substantially crystalline intergranular phase having a Diopside and Apatite structure.

2. The silicon nitride sintered body of claim 1, wherein said $Si_3N_4$ has a purity of at least 96%.

3. The silicon nitride sintered body of claim 2, wherein said $Y_2O_3$, MgO, and $CeO_2$, each have a purity of at least 96%.

4. A method of producing a silicon nitride sintered body comprising: mixing together 75-95% by weight of silicon nitride starting powder having $SiO_2$ present as an impurity therein, 2-15% by weight as $Y_2O_3$, 1-10% by weight as MgO and 1-10% by weight as $CeO_2$ to form a powdery mixture; molding the powdery mixture to form a molded body; sintering the molded body at a temperature of 1,650°-1,800° C. in a nitrogen or an inert gas atmosphere to form a sintered body; and cooling said sintered body to result in the cooled body having a substantially crystalline intergranular phase having a Diopside and Apatite structure.

5. The method of claim 4, wherein said $Si_3N_4$ has a purity of at least 96%.

6. The method of claim 4, wherein each of said $Y_2O_3$, MgO and $CeO_2$ each have a purity of at least 96%.

* * * * *